United States Patent
Borst et al.

(10) Patent No.: US 7,148,288 B2
(45) Date of Patent: *Dec. 12, 2006

(54) PROCESS FOR FORMATION OF PREFORMED STABILIZER POLYOLS

(75) Inventors: Joseph P. Borst, Plymouth, MI (US); Mao-Yao Huang, Riverview, MI (US); David D. Peters, Wyandotte, MI (US)

(73) Assignee: BASF Corporation, Florham Park, NJ (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/608,247

(22) Filed: Jun. 27, 2003

(65) Prior Publication Data

US 2004/0266958 A1 Dec. 30, 2004

(51) Int. Cl.
*C08F 116/06* (2006.01)

(52) U.S. Cl. .............. 525/56; 525/37; 525/59; 525/60; 525/62; 525/173; 525/118; 525/162; 525/263; 525/532; 525/332.9; 525/333.3; 524/147; 524/151; 528/75

(58) Field of Classification Search .......... 525/37, 525/56, 59, 60, 62, 173, 118, 162, 263, 273, 525/532, 332.9, 333.3; 524/147, 151; 528/75
See application file for complete search history.

(56) References Cited

U.S. PATENT DOCUMENTS

| 4,522,976 | A | | 6/1985 | Grace et al. |
|---|---|---|---|---|
| 5,223,570 | A | * | 6/1993 | Huang et al. .......... 525/53 |
| 5,814,699 | A | * | 9/1998 | Kratz et al. .......... 525/53 |
| 6,172,164 | B1 | * | 1/2001 | Davis et al. .......... 525/263 |
| 6,316,584 | B1 | | 11/2001 | Seidel et al. |
| 6,566,563 | B1 | | 5/2003 | Westfechel et al. |
| 2003/0181598 | A1 | | 9/2003 | Heyman et al. |

* cited by examiner

*Primary Examiner*—James J. Seidleck
*Assistant Examiner*—Olga Asinovsky
(74) *Attorney, Agent, or Firm*—Fernando A. Borrego

(57) ABSTRACT

A process is disclosed for formation of a preformed stabilizer for use in formation of graft polyols. The preformed stabilizer has a reduced level of transesterification products and results in less reactor fouling. The preformed stabilizer is prepared in the presence of phosphorous compounds, which reduces the unwanted transesterification products.

60 Claims, 5 Drawing Sheets

PROCESS FOR FORMATION OF PREFORMED STABILIZER POLYOLS

RELATED APPLICATIONS

None

STATEMENT REGARDING FEDERALLY SPONSORED RESEARCH

Not applicable.

BACKGROUND OF THE INVENTION

This invention relates generally to polymer polyol formation and, more particularly, to a process for preparing a transesterification stable preformed stabilizer for use in the formation of polymer polyols.

Polymer polyols, also know as graft polyols, are well know in polyurethane chemistry. They find special use in the formation of certain foams with special properties. Typically, graft polyols are formed as the reaction product of ethylenically unsaturated monomers with a macromer in the presence of a carrier polyol, a reaction moderator, optionally a preformed stabilizer, and a free radical polymerization initiator wherein the monomers copolymerize with the macromer. One of the difficulties associated with current processes for preparing graft polyols is that the reactors tend to accumulate fouling, which is a particularly significant problem for continuous reactors. This fouling causes the reactors to quickly become plugged with sediment of unstable compounds in the reaction. The reactor must be shut down and cleaned, leading to a loss in productivity of the reactor. Thus, it would be highly advantageous to create a process for the formation of graft polyols having a reduced tendency for fouling.

The typical macromers are polyether polyols having induced unsaturation prepared by reacting any conventional polyol with an organic compound having both ethylenic unsaturation and a carboxyl, anhydride, isocyanate, epoxy, or other group reactive with an active hydrogen-containing group. Suitable unsaturated isocyanates include compounds such as isocyanatoethylmethacrylate (IEM) and 1,1-dimethyl meta-isopropenyl benzyl isocyanate (TMI). Macromers are usually prepared in the presence of a Lewis acid catalyst.

The preformed stabilizers of the present invention, which are also graft polyols, are prepared by reaction of ethylenically unsaturated monomers with the macromer in the presence of a carrier polyol, a reaction moderator, and a free radical polymerization initiator. One problem associated with this reaction is the tendency to have formation of transesterification products between the macromer and the carrier polyol wherein the unsaturated group on the macromer gets transferred to the carrier polyol. This transesterification product can then cause problems in the subsequent graft polyol formation reaction using the preformed stabilizer. Thus, it would be advantageous to develop a method for reducing the transesterification reaction during formation of the preformed stabilizer or final graft polyol product.

SUMMARY OF THE INVENTION

In one embodiment, this invention provides a preformed stabilizer comprising the reaction product of: a Lewis acid catalyzed macromer; and at least one ethylenically unsaturated monomer; wherein the macromer and the monomer are polymerized in the presence of at least one free radical initiator, a carrier polyol, and at least one phosphorous compound.

In another embodiment, the present invention is a method for formation of a preformed stabilizer comprising the steps of: providing a Lewis acid catalyzed macromer; providing at least one ethylenically unsaturated monomer; and polymerizing the macromer and the monomer in the presence of at least one free radical initiator, a carrier polyol, and at least one phosphorous compound.

In another embodiment, the present invention is a final graft polyol comprising the reaction product of: a Lewis acid catalyzed macromer; and at least one ethylenically unsaturated monomer; wherein the macromer and the monomer are polymerized in the presence of at least one free radical initiator, a carrier polyol, and at least one phosphorous compound.

In another embodiment, the present invention is a method for formation of a final graft polyol comprising the steps of: providing a Lewis acid catalyzed macromer; providing at least one ethylenically unsaturated monomer; and polymerizing the macromer and the monomer in the presence of at least one free radical initiator, a carrier polyol, and at least one phosphorous compound.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
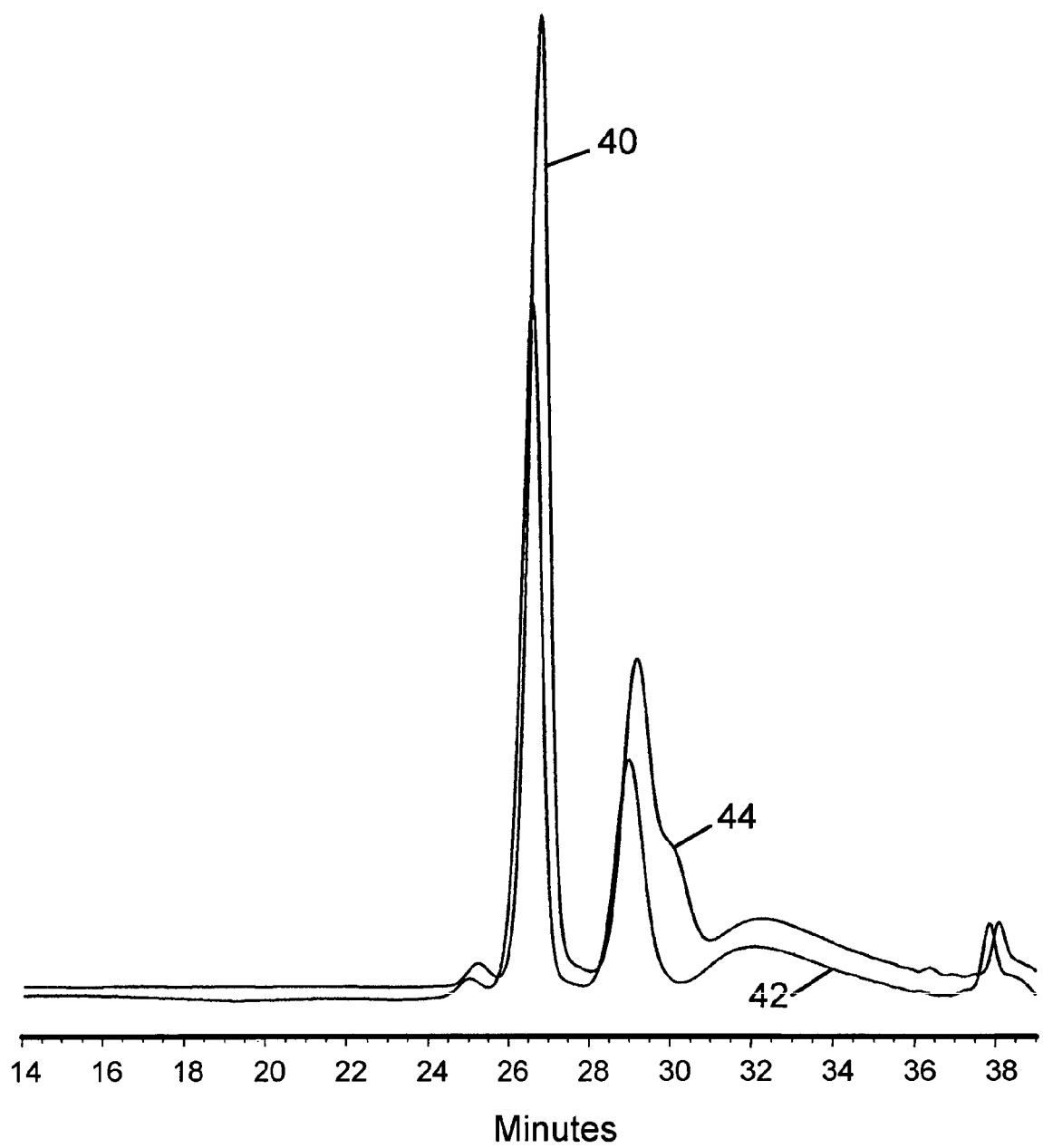
FIG. 1 is a comparison overlay of Gel Permeation Chromatography chromatograms of a mixture of a macromer and a carrier polyol heated to 130° C. in the presence or absence of phosphoric acid.

Methods of forming conventional polyether polyols are well known, for example, by the base catalyzed addition of alkylene oxides to an initiator molecule or nucleus containing reactive hydrogens such as a polyhydric alcohol. Examples of such polyhydric alcohol initiators include: glycerol, 1,1,1-trimethylolpropane, 1,1,1-trimethylolethane, 1,2,6-hexanetriol, pentaerythritol, sucrose, and sorbitol.

Other suitable initiators include both aliphatics and aromatics, such as, ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. Other suitable initiators for the polyether polyols of the present invention comprise hydrogenated starch hydrolysates, such as those available from Roquette under the tradename Lycasin®, which are derivatives of maltitol. The polyether polyols may be prepared by any known process such as, for example, the process disclosed by Wurtz in 1859, *Encyclopedia of Chemical Technology*, Vol. 7, pp. 257–262, published by Interscience Publishers, Inc. (1951) or in U.S. Pat. No. 1,922,459.

Examples of useful alkylene oxides include ethylene oxide, propylene oxide, butylene oxide, amylene oxide, tetrahydrofurans, epihalohydrins, arylalkylene styrene, and mixtures thereof. The alkylene oxides are added onto the initiator molecule and chain propagation is carried out in the presence of catalysts by either anionic polymerization or by cationic polymerization.

The preferred alkoxylation catalysts are potassium hydroxide, sodium hydroxide, alcoholates of potassium hydroxide, alcoholates of sodium hydroxide, cesium hydroxide, amines, Lewis acid catalysts, or double metal complex catalysts, all of which are known in the art.

Graft polyols are generally defined as vinyl polymer dispersions in polyether polyols as disclosed generally in U.S. Reissue Number Re. 33,291. Methods for the formation of typical graft polyols are known in the art. In the prior art graft polyols are typically prepared by the in situ polymerization of a polyether polyol having induced unsaturation, commonly known as a macromer, and an ethylenically unsaturated monomer or a mixture of ethylenically unsaturated monomers in the presence of a carrier polyol, a reaction moderator, optionally a preformed stabilizer, and a free radical polymerization initiator.

Generally, the macromers have induced unsaturation levels of between about 0.1 and 1 mole per mole of polyol. As used herein, the term macromer means a polyether polyol having induced unsaturation. The macromers employed in preparing the preformed stabilizer and the final graft polyol according to the present invention may be prepared by the reaction of any conventional polyol, described above, with an organic compound having both ethylenic unsaturation and a carboxyl, anhydride, isocyanate, epoxy, or other group reactive with an active hydrogen-containing group in the presence of a Lewis acid catalyst. Suitable unsaturated isocyanates include compounds such as isocyanatoethylmethacrylate (IEM) and 1,1-dimethyl meta-isopropenyl benzyl isocyanate (TMI).

Representatives of such organic compounds having ethylenic unsaturation and a reactive group include: maleic acid and anhydride, fumaric acid, crotonic acid and anhydride, propenyl succinic anhydride, acrylic acid, acryloyl chloride, hydroxyethyl acrylate or methacrylate, hydroxypropyl acrylate or methacrylate, halogenated maleic acids and anhydrides, unsaturated polyhydric alcohols such as 2-butene-1, 4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4, epoxide, butadiene monoxide, vinylglycidyl ether (1-vinyloxy-2,3-epoxy propane), glycidyl methacrylate and 3-allyloxypropylene oxide (allyl glycidyl ether), isocyanates such as isocyanatoethylmethacrylate (IEM) and 1,1-dimethyl meta-isopropenyl benzyl isocyanate (TMI). If a polycarboxylic acid or anhydride is employed to incorporate unsaturation into the polyols, it is preferable to react the unsaturated polyol with an alkylene oxide, preferably ethylene or propylene oxide, to remove the unreacted acid groups prior to employment as a macromer in the present invention. The amount of alkylene oxide employed is such as to reduce the acid number of the unsaturated polyol to about 5 or less.

In the typical reaction for formation of the macromer a reactor is charged with the desired conventional polyol and Lewis acid catalyst at a temperature of from 20 to 40° C. The amount of Lewis acid catalyst ranges from 0.2 to 50 parts per million (ppm), preferably from 0.5 to 25 ppm, most preferably from 1 to 15 ppm. The mixture is then heated to a temperature of from 70 to 130° C. and the organic compound having ethylenic unsaturation and a reactive group is added over 0.5 to 1 hours to the reactor. The contents are held there for 1 to 3 hours. The formed macromer is then used in the reaction for formation of the preformed stabilizer or final graft polyol as described below.

The suitable Lewis acid catalysts generally comprise tin-based, boron-based, aluminum-based, gallium-based, rare earth-based, zinc-based, or titanium-based compounds. Representative tin-based compounds include: Dibutyltin diacetate, Dibutyltin dibromide, Dibutyltin dichloride, Dibutyltin dilaurate, Dibutyltin dimethoxide, Dibutyltin oxide, Dimethyltin diacetate, Dimethyltin dibromide, Diphenyltin dichloride, Diphenyltin oxide, Methyltin trichloride, Phenyltin trichloride, Tin(IV) acetate, Tin(IV) bromide, Tin(IV) chloride, Tin(IV) iodide, Tin(II) oxide, Tin(II) acetate, Tin(II) bromide, Tin(II) chloride, Tin(II) iodide, and Tin(II) 2-ethylhexanoate (stannous octoate). Representative boron-based compounds include: Boron tribromide, Boron trichloride, Boron trifluoride, and tris(pentafluorophenyl)borane. Representative aluminum-based compounds include: Aluminum chloride and Aluminum bromide. Representative gallium-based compounds include: Gallium chloride, Gallium bromide, and Gallium(III) actylacetonate. Representative rare earth catalysts are generally salts of Scandium, Yttrium, Lanthanum, Praseodymium, Neodymium, Erbium, Thulium, Ytterbium, Neodymium or Lutetium. Examples include: Ytterbium triflate, Ytterbium (III) actylacetonate, Erbium(III) trifluorosulfonate (erbium triflate), Erbium(III) actylacetonate, Holmium triflate, Terbium triflate, Europium triflate, Europium(III) trifluroacetate, Samarium triflate, Neodymium triflate, Neodymium (III) actylacetonate, Praseodymium triflate, Lanthanum triflate, and Dysprosium triflate. Representative zinc-based compounds include Zinc chloride and Zinc bromide. Representative titanium compounds include Titanium(IV) bromide and Titanium(IV) chloride.

As discussed above the preformed stabilizer of the present invention is formed by reacting ethylenically unsaturated monomers with a macromer in the presence of a carrier polyol, a free radical initiator, and optionally a reaction moderator.

Representative ethylenically unsaturated monomers which may be employed in preparing the preformed stabilizer or graft polyols of the present invention include: butadiene, isoprene, 1,4-pentadiene, 1,6-hexadiene, 1,7-octadiene, styrene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methylacryl acrylate, 2-hydroxyethyl acrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacryloyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinylmethoxyacetate, vinyl benzoate, vinyl toluene, vinylnaphthalene, vinyl methyl ether, vinyl propyl ethers, vinyl butyl ethers, vinyl 2-ethylhexyl ether, vinylphenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinylethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like.

Any of the known polymerizable ethylenically unsaturated monomers can be used and the compounds listed above are illustrative and not restrictive of the monomers suitable for use in this invention. In a preferred embodiment of the present invention, the monomer comprises acrylonitrile, styrene, or a mixture thereof. Preferably the mixture comprises from 20 to 80% acrylonitrile with the remainder comprising styrene.

The amount of ethylenically unsaturated monomers employed in the graft polymerization reaction for the preformed stabilizer is generally from 3 to 15% by weight, based on the total weight of the product; preferably from 5 to 10 percent by weight monomers. The amount of ethylenically unsaturated monomers employed in the graft polymerization reactions for a final graft polyol is generally from 25 to 70% by weight, based on the total weight of the product; preferably from 40 to 55 percent by weight monomers.

Free radical polymerization initiators that may be used include the well-known free radical polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl)peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha, alpha'-azobis-(2-methylheptonitrile), 1,1'-azobis(cyclohexane carbonitrile), 4,4'azobis-(4-cyanopentanoic acid), 2,2'-azobis(isobutyronitrile), 1-t-butylazo-1-cyanocyclohexane, persuccinic acid, diisopropyl peroxydicarbonate, 4,4'-azobis(2,4-dimethylvaleronitrile), 2-t-butylazo-2-cyano-4-methoxy-4-methylpentan 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2,2'-azobis-2-methylbutyronitrile, 2-t-butylazo-2-cyano-4-methylpentane, 2-t-buylazo-2-isobutyronitrile, 2-butylperoxyisopropyl carbonate, 1,1-tertiary-amylperoxy cyclohexane, tertiary-amylperoxy-2-ethylhexanoate, and the like; a mixture of initiators may also be used. In a preferred embodiment of the present invention a mixture of 1,1-tertiary-amylperoxy cyclohexane and tertiary-amylperoxy-2-ethylhexanoate is used as the initiator.

Generally the graft polymerization reaction for formation of the preformed stabilizer will employ from about 0.1 weight percent to about 10 weight percent of a free radical polymerization initiator based on the total weight of the monomers utilized. The graft polymerization reaction for formation of the final graft polyol will generally employ from about 0.1 to about 3 weight percent and more preferably from about 0.3 to 1 weight percent of a free radical polymerization initiator based on the total weight of the monomers utilized.

The presence of a reaction moderator during formation of the preformed stabilizer and the graft polyol is optional, but useful. The reaction moderator is preferably an alcohol, mercaptan, a haloalkane, or mixtures thereof. Among the reaction moderators which may be employed are the following: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanate, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutylraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, 1,4-benzoquinone, methyl stearate, tetraethylsilane, triethylsilane, dibromostilbene, alpha-bromostyrene, alpha-methylstyrene, tetraphenyl succinonitrile, 2,4,6-trinitrotoluene, p-toluidine, N,N-dimethyl-p-toluidine, alpha-cyano-p-tolunitrile, alpha,alpha'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-naphthalenethiol, 1-octanethiol, 1-heptanethiol, 2-octanethiol, 1-tetradecanethiol, benzyl thiol, isopropanol, 2-butanol, carbon tetrabromide, bromotrichloromethane, tertiary-dodecylmercaptan, and any combination of the above compounds. Preferred reaction moderators are 2-propanol, 2-butanol, and mixtures thereof. The amount of reaction moderator that is employed preferably ranges from 0.5 to 25 weight percent, based on the total weight of the monomers.

The carrier polyol used to form either the preformed stabilizer or the final graft polyol according to the present invention may comprise any conventional polyol described above. The carrier polyol used in the formation of the preformed stabilizer and the final graft polyol need not be the same; however, they can be the same. The carrier polyol may comprise initiator plus propylene oxide with an ethylene oxide cap of from 0 to 30 percent by weight. Alternatively, the carrier polyol can comprise an initiator plus a heteric mixture of alkylene oxides with or without an ethylene oxide or propylene oxide cap. The characteristics of the desired carrier polyol are in part determined by the desired properties of the foam to be prepared using the graft polyol. The amount of carrier polyol in the formula ranges from 50 to 90 percent by weight, with about 60 to 75 percent by weight more preferred and approximately 68 weight percent most preferred. The amount of carrier polyol used in the reaction for formation of the preformed stabilizer based on the total amount of carrier polyol used in the whole process generally ranges from 1 to 10% by weight.

In general, the preformed stabilizer is made in a reactor under an inert atmosphere by a semi-batch process. A free radical polymerization of ethylenically unsaturated monomers in the presence of the macromer, a free radical initiator, a carrier polyol, and optionally a reaction modifier is carried out. The reaction is run at a temperature of from 90 to 140° C., with a preferred temperature of 110 to 130° C. To form the preformed stabilizer some of the carrier polyol, some or none of the reaction modifier, and all of the macromer are charged to the reactor, agitated and heated to 110 to 130° C. The amount of macromer used based on the total weight of macromer and carrier polyol in this reactor ranges from 24 to 28% by weight. The unsaturated monomers and any remaining reaction modifier are charged to a monomer feed tank while the remainder of the carrier polyol and the free radical initiator are charged to a polyol feed tank. Streams from the monomer feed tank and the polyol feed tank are pumped together through an in-line static mixer and charged into the hot mixture in the reactor. Once the reaction is complete, the preformed stabilizer can be stored in the unstripped state for use in the formation of a final graft polyol. Preferably, the preformed stabilizer is stripped prior to use in formation of a final graft polyol. Preferably, the final calculated solids content in the preformed stabilizer is from about 5 to 20% by weight; more preferred between 10 and 15% by weight, most preferred is about 14% by weight.

Generally, formation of the final graft polyol is the same as described for the preformed stabilizer above. However, the amount of monomers used is higher to achieve the desired solids content for a final graft polyol. The final calculated solids content in final graft polyols is generally from about 25 to 70% by weight; more preferred between 30 and 60% by weight, most preferred is from about 40 to 55% by weight. Optionally, the preformed stabilizer described above may be used in formation of the final graft polyol, in which case the preformed stabilizer generally replaces the macromer used as a reactant in the process described above. The benefits of using a preformed stabilizer is well known in the art, for example, as described in U.S. Pat. No. 5,223,570, the disclosure of which is incorporated herein by reference.

As discussed above, one observation that has been made is that during the formation of the preformed stabilizer a certain amount of transesterification product is formed. This product is an adduct of the unsaturated organic compound used to form the macromer and the carrier polyol. This adduct can interfere with the filterability of the final graft polyol, alter its viscosity, increase fouling of the reactor, and alter the chemical properties of the final graft polyol. Thus preventing the transesterification is very beneficial. The present inventors have unexpectedly found a straight-forward method for preventing this transesterification reaction.

Not wishing to be bound by theory, it is believed that the Lewis acid catalyst used to form the macromer, which is added when the macromer is used in the reaction for formation of the preformed stabilizer, catalyzes the transesterification. It has been surprisingly found that use of phosphorous compounds based on the amount of Lewis acid can prevent the transesterification reaction. Suitable phosphorous compounds include compounds containing phosphorus-oxygen bonds, by way of non-limiting example: phosphoric acid, phosphorous acid, compounds containing the phosphate and/or phosphite anion, and mixtures of all of these compounds. In the present specification and claims all of these compounds are intended to be encompassed by the term phosphorous compounds. It is preferable that the amount of phosphorous compound be used in a weight to weight ratio of from 1:1 to 10:1 relative to the weight of the Lewis acid catalyst used in the reaction for formation of the macromer. Thus, the preferred amounts range from 0.2 to 500 ppm, more preferably from 0.5 to 250 ppm, and most preferably from 1 to 150 ppm of phosphorous compound. The phosphorous compound can be added either to the macromer before it is used in the reaction for the formation of the preformed stabilizer or as an initial charge to the reactor for formation of the preformed stabilizer.

EXAMPLES

A macromer is formed as follows. The conventional polyol used is a sucrose and water co-initiated polyol having a theoretical number average molecular weight of approximately 6,800 Daltons. The conventional polyol has an intrinsic unsaturation of approximately 0.09–0.15 meq/g. The conventional polyol contains approximately 93 wt. % propylene oxide and initiators based on the total weight of the polyol and approximately a 7 wt. % ethylene oxide cap based on the total weight. The hydroxyl number of the conventional polyol is approximately 25. The conventional polyol has a theoretical average functionality of approximately 4.51 to 4.97 based on Gel Permeation Chromatography analysis. The macromer is formed by first charging to a reactor the conventional polyol and 50 ppm dibutyltin dilaurate (T-12) catalyst at room temperature. The mixture is heated to 80° C. and the TMI is added dropwise to the mixture over 0.5 hours. The mixture was allowed to react another hour after completion of the addition. The macromer is subsequently bottled for storage. Approximately 0.36 to 0.4 moles of TMI are added to each mole of polyol in the final macromer. Essentially all of the unsaturation is retained in the resulting macromer.

A carrier polyol for use in the preformed stabilizer reaction is a glycerin-initiated conventional polyol comprising a heteric portion formed from propylene oxide and ethylene oxide at a molar ratio of 4.2:1. The carrier polyol also has a propylene oxide cap of 10 wt. % based on the total weight of the polyol and a hydroxyl number of 51.

In one experiment two mixtures were prepared. A first mixture included: macromer, carrier polyol and phosphoric acid present in a weight to weight ration of 1:1 based on the weight of the T-12. A second mixture included the macromer and the carrier polyol only. Both mixtures were heated to 130° C. and held there for a period of time. This temperature is the stripping temperature usually used to strip the unreacted components from the preformed stabilizer reaction. Then Gel Permeation Chromatography (GPC) was performed on each sample and the overlayed results are shown in FIG. 1. In FIG. 1, chromatogram 40 represents the second mixture while chromatogram 42 represents the first mixture, which contained the phosphoric acid. Shoulder 44 in FIG. 1 represents the position of the transesterification product of the TMI and the carrier polyol. The results demonstrate that in the absence of phosphoric acid, chromatogram 40, there is significant formation of this product. In the presence of the phosphoric acid there is none.

In another experiment a preformed stabilizer was prepared as follows. A portion of the carrier polyol, no reaction modifier, and all of the macromer are charged to a reactor, agitated and heated to 110° C. The amount of macromer used based on the total weight of macromer and carrier polyol in this reaction ranges from 24 to 28% by weight. The ethylenically unsaturated monomers, acrylonitrile and stryrene at a weight to weight ratio of 1:20, are charged to a monomer feed tank while the remainder of the carrier polyol and the free radical initiator, t-amyl peroxy-2-ethyl hexanoate (TRIGONOX 121), are charged to a polyol feed tank. The streams from the monomer feed tank and the polyol feed tank are pumped together through an in-line static mixer and charged into the hot mixture in the reactor. The reaction temperature is 126° C. and the total feed time is 70 minutes. Once the reaction is complete, the preformed stabilizer is stripped at 130° C. Preferably, the final calculated solids content in the preformed stabilizer is from about 5 to 20%. In a first reaction the macromer, described above, did not contain any phosphoric acid. In a second reaction the macromer did contain phosphoric acid at a weight to weight ratio of 1:1 based on the weight of the T-12. Each preformed stabilizer was then subjected to GPC and the overlayed results are shown in FIG. 2.

Figure 2:
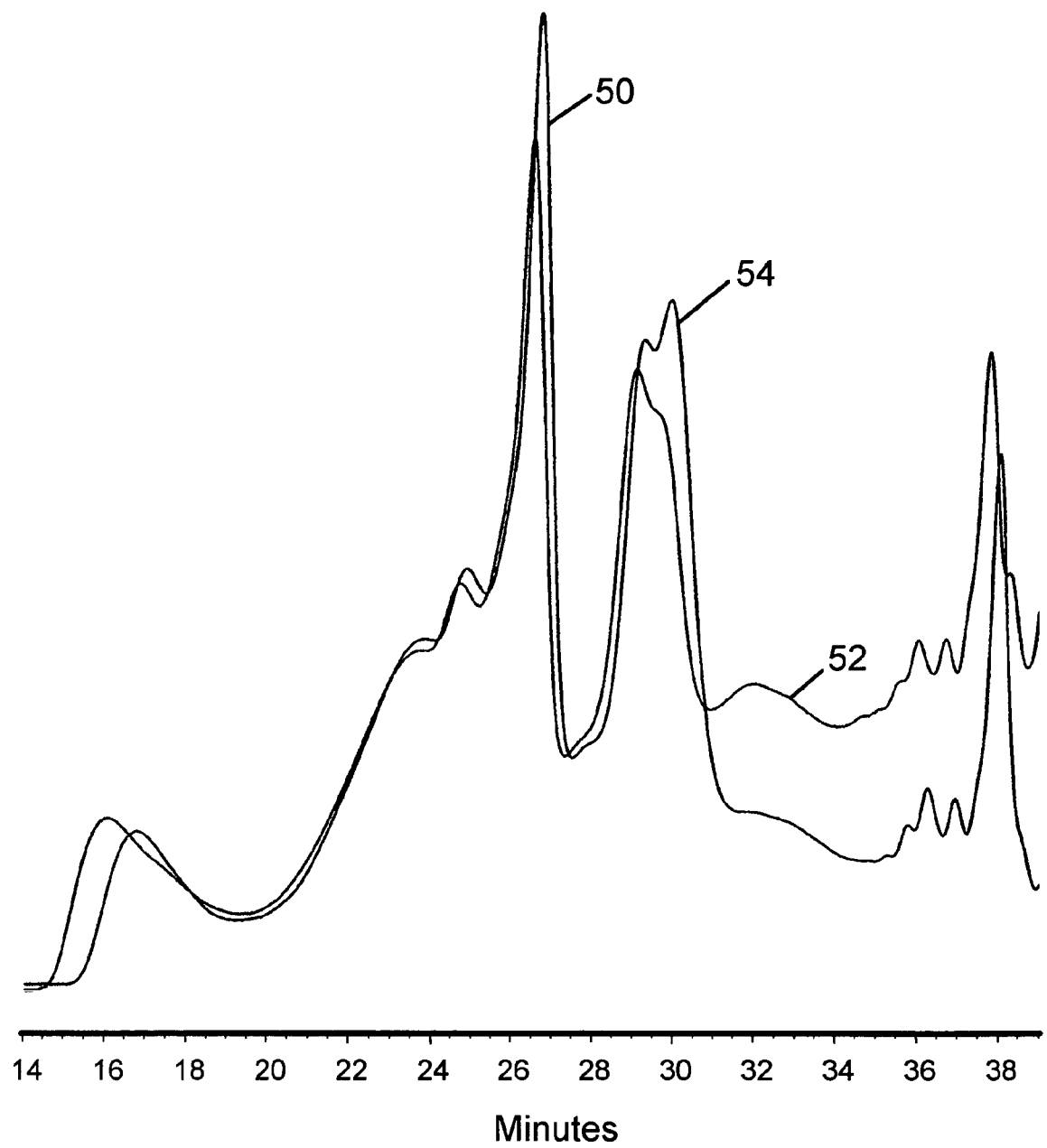
FIG. 2 is a comparison overlay of Gel Permeation Chromatography chromatograms of a preformed stabilizer prepared using a macromer either having or not having phosphoric acid.

In FIG. 2, chromatogram 50 represents a preformed stabilizer formed without phosphoric acid and chromatogram 52 represents a preformed stabilizer prepared with phosphoric acid. Peak 54 represents the transesterification product of the TMI and the carrier polyol. The results demonstrate that the presence of the phosphoric acid significantly reduces the formation of the transesterification product.

Figure 3:
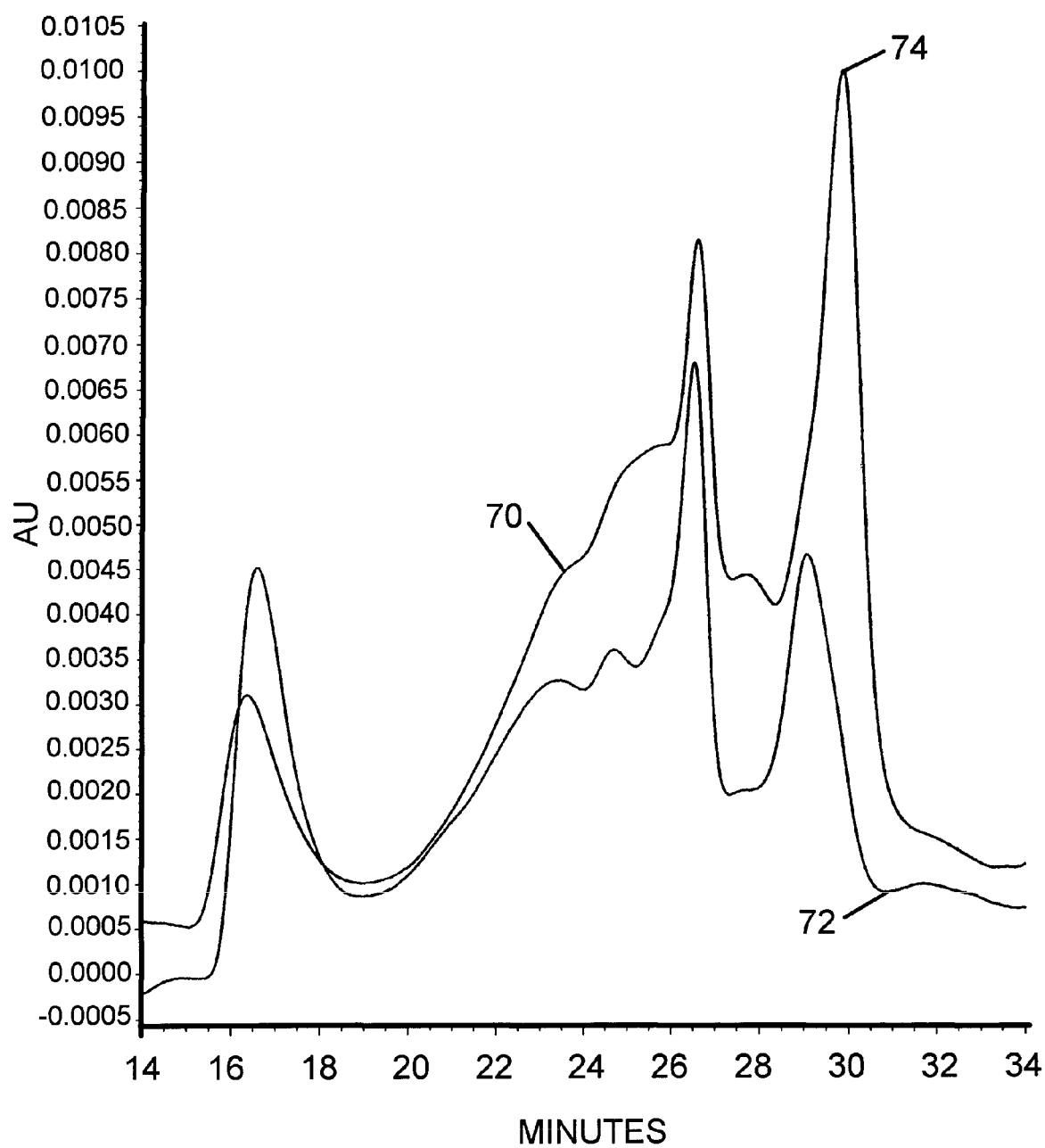
FIG. 3 is a comparison overlay of Gel Permeation Chromatography chromatograms of a preformed stabilizer prepared in the presence or absence of a phosphoric acid reactor charge.

In another experiment a preformed stabilizer was prepared with phosphoric acid at a 1:1 weight ratio based on the T-12 or a preformed stabilizer was prepared without phosphoric acid as described above. In FIG. 3 the results of the experiment are shown. Chromatogram 70 represents a preformed stabilizer formed using no phosphoric acid. Chromatogram 72 represents a preformed stabilizer in the presence of a 1:1 weight ratio of phosphoric acid to T-12 from the macromer. Peak 74 represents the transesterification product of TMI and the carrier polyol. The results show that the preformed stabilizer made in the presence of the phosphoric acid has a dramatically reduced level of transesterification products. In addition, a graft polyol made with the preformed stabilizer having phosphoric acid had a low viscosity and could readily be filtered through a 25 micron filter, however, a graft polyol prepared with the preformed stabilizer not having phosphoric acid had a higher viscosity and could not be filtered through a 25 micron filter.

Figure 4:
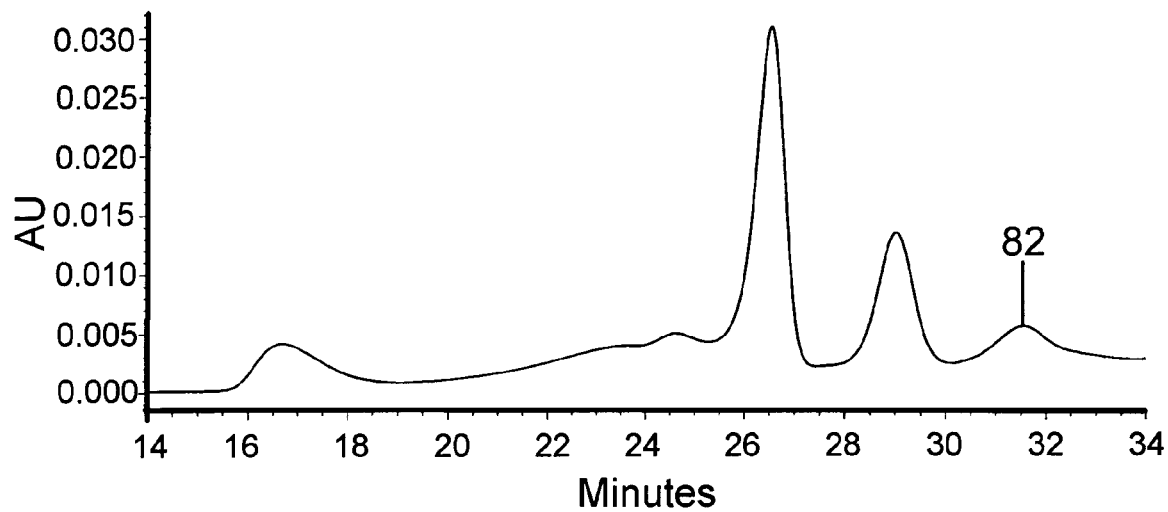
FIG. 4 is a Gel Permeation Chromatography chromatogram of a macromer showing the presence of a carrier polyol transesterification product.
Figure 5:
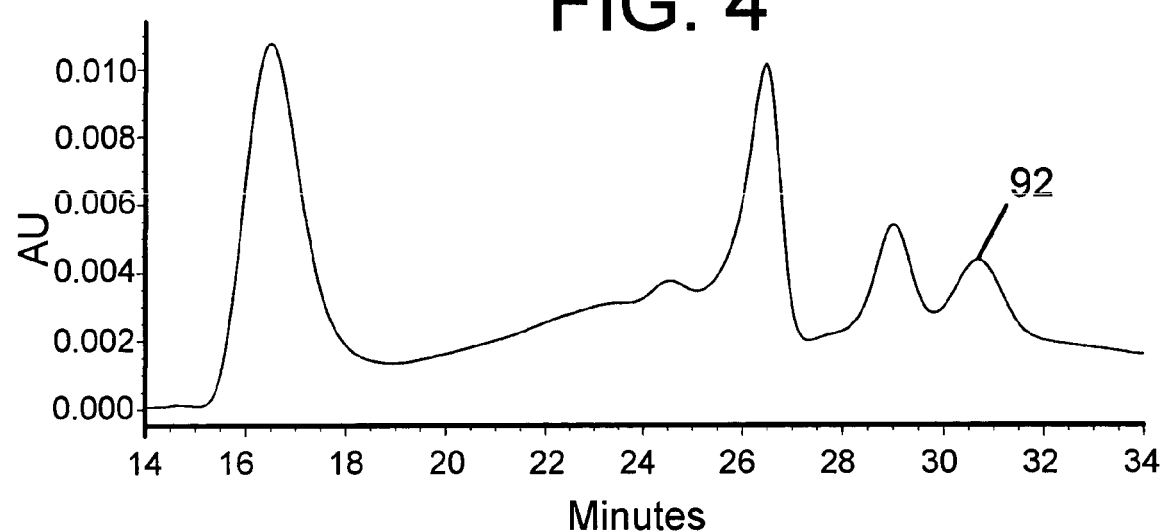
FIG. 5 is a Gel Permeation Chromatography chromatogram of a macromer showing the presence of a carrier polyol transesterification product.
Figure 6:
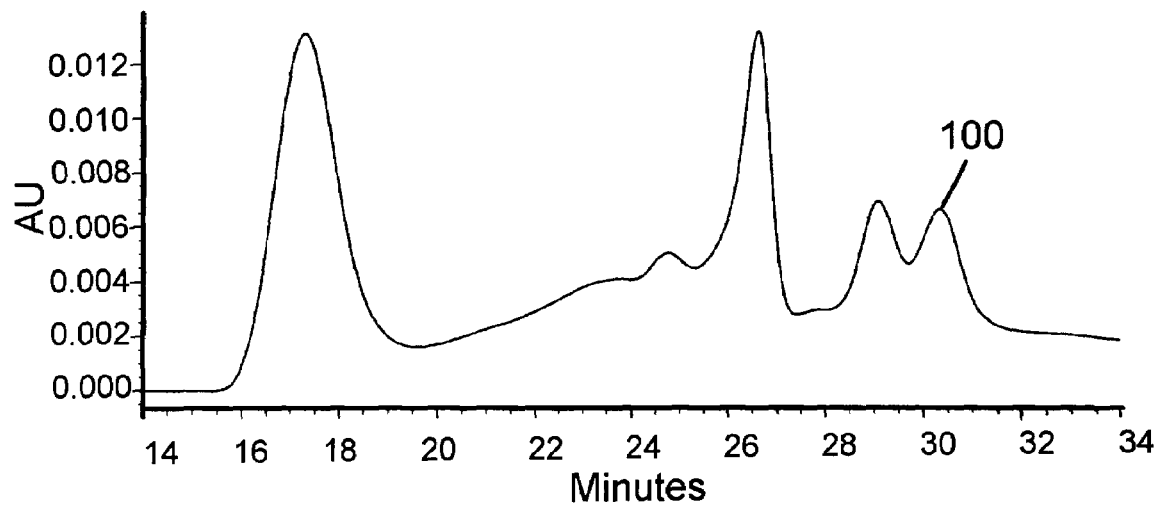
FIG. 6 is a Gel Permeation Chromatography chromatogram of a macromer showing the presence of a carrier polyol transesterification product.
Figure 7:
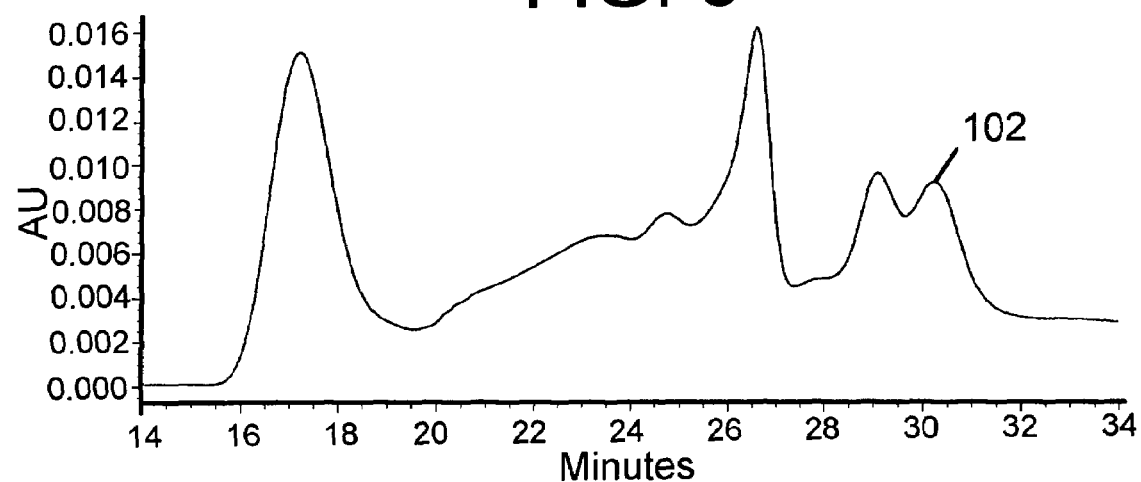
FIG. 7 is a Gel Permeation Chromatography chromatogram of a macromer showing the presence of a carrier polyol transesterification product.

In another experiment a series of preformed stabilizers were made as described above using other lower molecular weight carrier polyols in the absence of phosphoric acid to demonstrate that the transesterification products can also form with these carrier polyols in the preformed stabilizer. The results are shown in FIGS. 4 to 7. In FIG. 4 the carrier polyol used is a glycerine-initiated polyol containing only propylene oxide. The polyol had a hydroxyl number of 112 and a number average molecular weight of 1434 Daltons. Peak 82 is the transesterification product of TMI and the carrier polyol. In FIG. 5 the carrier polyol used is a propylene glycol and water co-initiated polyol containing only propylene oxide. The polyol had a hydroxyl number of 56 and a number average molecular weight of 1942 Daltons. Peak 92 is the transesterification product of TMI and the carrier polyol. In FIG. 6 the carrier polyol used is a glycerine-initiated polyol containing only propylene oxide. The polyol had a hydroxyl number of 64 and a number average molecular weight of 2495 Daltons. Peak 100 is the transesterification product of TMI and the carrier polyol. In FIG. 7 the carrier polyol used is a glycerine-initiated polyol formed as a propylene oxide ethylene oxide heteric containing approximately 13% ethylene oxide. The polyol also has a propylene oxide cap of 10%. The polyol had a hydroxyl number of 64 and a number average molecular weight of 2937 Daltons. Peak 102 is the transesterification product of TMI and the carrier polyol.

The inventors have also found that use of the preformed stabilizer prepared according to the present invention in formation of graft polyols dramatically reduces the reactor fouling that usually accompanies graft polyol reactions. In fact it has been found that the reactor can be run at least 17% longer than before resulting in enhanced productivity.

The present invention finds utilization at a number of different points in the usual process for formation of graft polyols. The present invention specifically prevents transesterification reactions that can occur when a macromer is combined with the carrier polyol in the presence of heating. The phosphoric acid can be added to the macromer after formation of the macromer and during storage of the macromer. The phosphoric acid can be added to a reactor during the formation reaction for forming of a preformed stabilizer as described above. In addition, the phosphoric acid can be added to a graft polyol formation reaction either in the presence or the absence of a preformed stabilizer.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A preformed stabilizer comprising the reaction product of:
    a) a Lewis acid catalyzed macromer comprising a Lewis acid; and
    b) at least one ethylenically unsaturated monomer;
    wherein said macromer and said monomer are polymerized in the presence of at least one free radical initiator, a carrier polyol, and at least one phosphorous compound, and
        wherein said phosphorus compound reacts with said Lewis acid.

2. A preformed stabilizer as recited in claim 1, wherein said macromer comprises the reaction product of a polyol and a compound having both ethylenic unsaturation and a group reactive with an active hydrogen-containing group on said polyol in the presence of said Lewis acid.

3. A preformed stabilizer as recited in claim 2, wherein said compound having both ethylenic unsaturation and a group reactive with an active hydrogen containing group on said polyol comprises an isocyanate.

4. A preformed stabilizer as recited in claim 1, wherein said Lewis acid is at least one of tin-based, boron-based, aluminum-based, gallium-based, rare earth-based, zinc-based, and titanium-based compounds.

5. A preformed stabilizer as recited in claim 1, wherein said Lewis acid is present in an amount of from 0.2 to 50 parts per million based on the weight of said macromer.

6. A preformed stabilizer as recited in claim 1, wherein said Lewis acid is present in an amount of from 0.5 to 25 parts per million based on the weight of said macromer.

7. A preformed stabilizer as recited in claim 1, wherein said Lewis acid is present in an amount of from 1 to 15 parts per million based on the weight of said macromer.

8. A preformed stabilizer as recited in claim 1, wherein said ethylenically unsaturated monomer is selected from the group of acrylonitrile, styrene, and mixtures thereof.

9. A preformed stabilizer as recited in claim 1, wherein said phosphorous compound is selected from the group of phosphoric acid, phosphorous acid, compounds containing a phosphate anion, compounds containing a phosphite anion, and mixtures thereof.

10. A preformed stabilizer as recited in claim 1, wherein said phosphorous compound is present in weight to weight ratio of from 10:1 to 1:1 based on the weight of said Lewis acid used to form said macromer.

11. A preformed stabilizer as recited in claim 1, wherein said phosphorous compound is present in an amount of from 0.2 to 500 parts per million based on the weight of said macromer.

12. A preformed stabilizer as recited in claim 1, wherein said phosphorous compound is present in an amount of from 0.5 to 250 parts per million based on the weight of said macromer.

13. A preformed stabilizer as recited in claim 1, wherein said phosphorous compound is present in an amount of from 1 to 150 parts per million based on the weight of said macromer.

14. A method for formation of a preformed stabilizer comprising the steps of:
   a) providing a Lewis acid catalyzed macromer comprising a Lewis acid;
   b) providing at least one ethylenically unsaturated monomer; and
   c) polymerizing the macromer and the monomer in the presence of at least one free radical initiator, a carrier polyol, and at least one phosphorous compound,
   wherein the phosphorous compound reacts with the Lewis acid.

15. The method as recited in claim 14, wherein step a) comprises forming the macromer by reacting a polyol and a compound having both ethylenic unsaturation and a group reactive with an active hydrogen containing group on the polyol in the presence of the Lewis acid.

16. The method as recited in claim 15, comprising providing an isocyanate as the compound having both ethylenic unsaturation and a group reactive with an active hydrogen containing group on the polyol.

17. The method as recited in claim 15, wherein the Lewis acid is at least one of tin-based, boron-based, aluminum-based, gallium-based, rare earth-based, zinc-based, and titanium-based compounds.

18. The method as recited in claim 14, comprising providing the Lewis acid in an amount of from 0.2 to 50 parts per million based on the weight of the macromer.

19. The method as recited in claim 14, comprising providing the Lewis acid in an amount of from 0.5 to 25 parts per million based on the weight of the macromer.

20. The method as recited in claim 14, comprising providing the Lewis acid in an amount of from 1 to 15 parts per million based on the weight of the macromer.

21. The method as recited in claim 14, wherein step b) comprises providing acrylonitrile, styrene, or a mixture thereof as the ethylenically unsaturated monomer.

22. The method as recited in claim 14, wherein step c) comprises providing phosphoric acid, phosphorous acid, a compound containing a phosphate anion, a compound containing a phosphite anion, or a mixture of two or more of these as the phosphorus compound.

23. The method as recited in claim 14, comprising the phosphorous compound in a weight to weight ratio of from 10:1 to 1:1 based on the weight of the Lewis acid used to form the macromer of step a).

24. The method as recited in claim 14, wherein step c) comprises providing the phosphorous compound in an amount of from 0.2 to 500 parts per million based on the weight of the macromer.

25. The method as recited in claim 14, wherein step c) comprises providing the phosphorous compound in an amount of from 0.5 to 250 parts per million based on the weight of the macromer.

26. The method as recited in claim 14, wherein step c) comprises providing the phosphorous compound in an amount of from 1 to 150 parts per million based on the weight of the macromer.

27. The method as recited in claim 14, wherein the phosphorous compound is combined with one of the Lewis acid catalyzed macromer or the carrier polyol prior to polymerizing the macromer and the monomer in the presence of the free radical initiator and the carrier polyol.

28. A final graft polyol comprising the reaction product of:
   a) a Lewis acid catalyzed macromer comprising a Lewis acid; and
   b) at least one ethylenically unsaturated monomer;
wherein said macromer and said monomer are polymerized in the presence of at least one free radical initiator, a carrier polyol, and at least one phosphorous compound, and
wherein said phosphorus compound reacts with said Lewis acid.

29. A final graft polyol as recited in claim 28, wherein said macromer comprises the reaction product of a polyol and a compound having both ethylenic unsaturation and a group reactive with an active hydrogen containing group on said polyol in the presence of said Lewis acid.

30. A final graft polyol as recited in claim 29, wherein said compound having both ethylenic unsaturation and a group reactive with an active hydrogen-containing group on said polyol comprises an isocyanate.

31. A final graft polyol as recited in claim 28, wherein said Lewis acid is at least one of tin-based, boron-based, aluminum-based, gallium-based, rare earth-based, zinc-based, and titanium-based compounds.

32. A final graft polyol as recited in claim 28, wherein said Lewis acid is present in an amount of from 0.2 to 50 parts per million based on the weight of said macromer.

33. A final graft polyol as recited in claim 29, wherein said Lewis acid is present in an amount of from 0.5 to 25 parts per million based on the weight of said macromer.

34. A final graft polyol as recited in claim 29, wherein said Lewis acid is present in an amount of from 1 to 15 parts per million based on the weight of said macromer.

35. A final graft polyol as recited in claim 28, wherein said ethylenically unsaturated monomer is selected from the group of acrylonitrile, styrene, and mixtures thereof.

36. A final graft polyol as recited in claim 28, wherein said phosphorous compound is selected from the group of phosphoric acid, phosphorous acid, compounds containing a phosphate anion, compounds containing a phosphite anion, and mixtures thereof.

37. A final graft polyol as recited in claim 28, wherein said phosphorous compound is present in weight to weight ratio of from 10:1 to 1:1 based on the weight of said Lewis acid used to form said macromer.

38. A final graft polyol as recited in claim 28, wherein said phosphorous compound is present in an amount of from 0.2 to 500 parts per million based on the weight of said macromer.

39. A final graft polyol as recited in claim 28, wherein said phosphorous compound is present in an amount of from 0.5 to 250 parts per million based on the weight of said macromer.

40. A final graft polyol as recited in claim 28, wherein said phosphorous compound is present in an amount of from 1 to 150 parts per million based on the weight of said macromer.

41. A final graft polyol as recited in claim 28, wherein said macromer and said monomer are polymerized in the presence of said at least one free radical initiator, said carrier polyol, said at least one phosphorous compound, and a preformed stabilizer.

42. A final graft polyol as recited in claim 41, wherein said preformed stabilizer is formed in the presence of a phosphorous compound.

43. A method for formation of a final graft polyol comprising the steps of:
   a) providing a Lewis acid catalyzed macromer comprising a Lewis acid;
   b) providing at least one ethylenically unsaturated monomer; and
   c) polymerizing the macromer and the monomer in the presence of at least one free radical initiator, a carrier polyol, and at least one phosphorous compound,
wherein the phosphorous compound reacts with the Lewis acid.

44. The method as recited in claim 43, wherein step a) comprises forming the macromer by reacting a polyol and a compound having both ethylenic unsaturation and a group reactive with an active hydrogen containing group on the polyol in the presence of the Lewis acid.

45. The method as recited in claim 44, comprising providing an isocyanate as the compound having both ethylenic unsaturation and a group reactive with an active hydrogen containing group on the polyol.

46. The method as recited in claim 43, wherein the Lewis acid is at least one of tin-based, boron-based, aluminum-based, gallium-based, rare earth-based, zinc-based, and titanium-based compounds.

47. The method as recited in claim 43, comprising providing the Lewis acid in an amount of from 0.2 to 50 parts per million based on the weight of the macromer.

48. The method as recited in claim 43, comprising providing the Lewis acid in an amount of from 0.5 to 25 parts per million based on the weight of the macromer.

49. The method as recited in claim 43, comprising providing the Lewis acid in an amount of from 1 to 15 parts per million based on the weight of the macromer.

50. The method as recited in claim 43, wherein step b) comprises providing acrylonitrile, styrene, or a mixture thereof as the ethylenically unsaturated monomer.

51. The method as recited in claim 43, wherein step c) comprises providing phosphoric acid, phosphorous acid, a compound containing a phosphate anion, a compound containing a phosphite anion, or a mixture of two or more of these as the phosphorus compound.

52. The method as recited in claim 43, comprising the phosphorous compound in a weight to weight ratio of from 10:1 to 1:1 based on the weight of the Lewis acid used to form the macromer of step a).

53. The method as recited in claim 43, wherein step c) comprises providing the phosphorous compound in an amount of from 0.2 to 500 parts per million based on the weight of the macromer.

54. The method as recited in claim 43, wherein step c) comprises providing the phosphorous compound in an amount of from 0.5 to 250 parts per million based on the weight of the macromer.

55. The method as recited in claim 43, wherein step c) comprises providing the phosphorous compound in an amount of from 1 to 150 parts per million based on the weight of the macromer.

56. The method as recited in claim 43, wherein the phosphorous compound is combined with one of the Lewis acid catalyzed macromer or the carrier polyol prior to polymerizing the macromer and the monomer in the presence of the free radical initiator and the carrier polyol.

57. The method as recited in claim 43, wherein step c) further comprises polymerizing the macromer and the monomer in the presence of the at least one free radical initiator, the carrier polyol, the at least one phosphorous compound, and a preformed stabilizer.

58. The method as recited in claim 57, further comprising forming the preformed stabilizer in the presence of a phosphorous compound.

59. A method for formation of a final graft polyol comprising the steps of:
   a) providing a preformed stabilizer as recited in claim 1;
   b) providing at least one ethylenically unsaturated monomer; and
   c) polymerizing the preformed stabilizer and the monomer in the presence of at least one free radical initiator, a carrier polyol, and at least one phosphorous compound.

60. A final graft polyol made in accordance with the process as recited in claim 59.

* * * * *